Feb. 13, 1923.

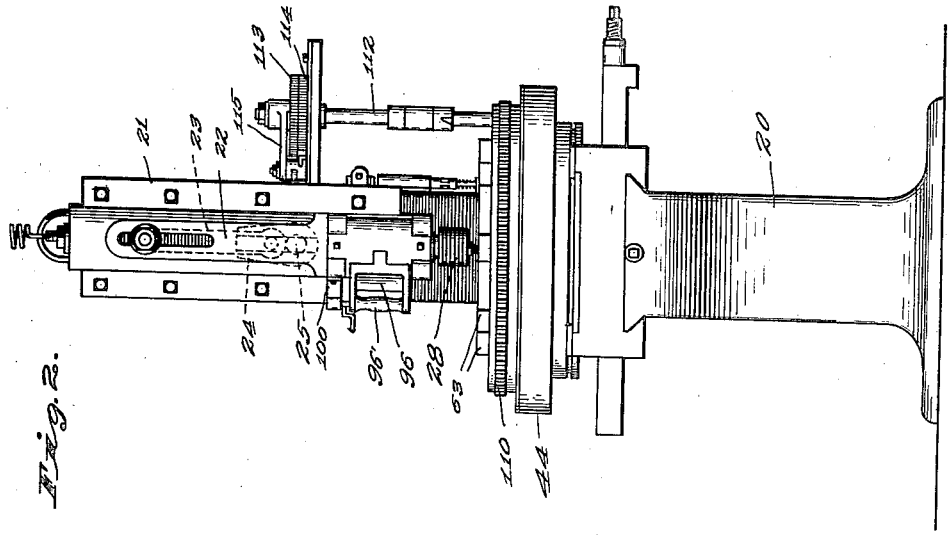

G. E. STEVENSON ET AL.
GEAR CUTTER.
FILED AUG. 8, 1919.

1,445,458.

6 SHEETS—SHEET 2.

WITNESS:
Frank A. Fahle

INVENTORS
George R. Stevenson
George E. Stevenson
BY
Hood & Schley
ATTORNEYS.

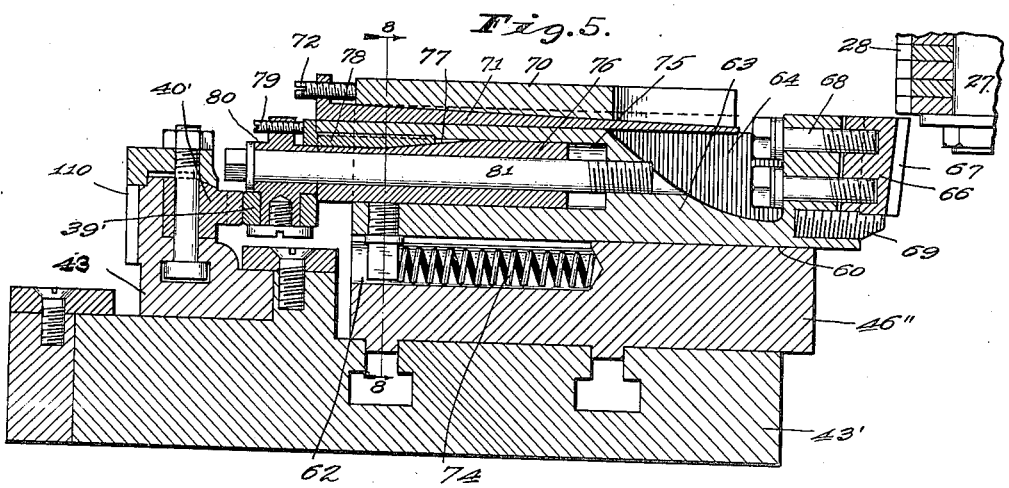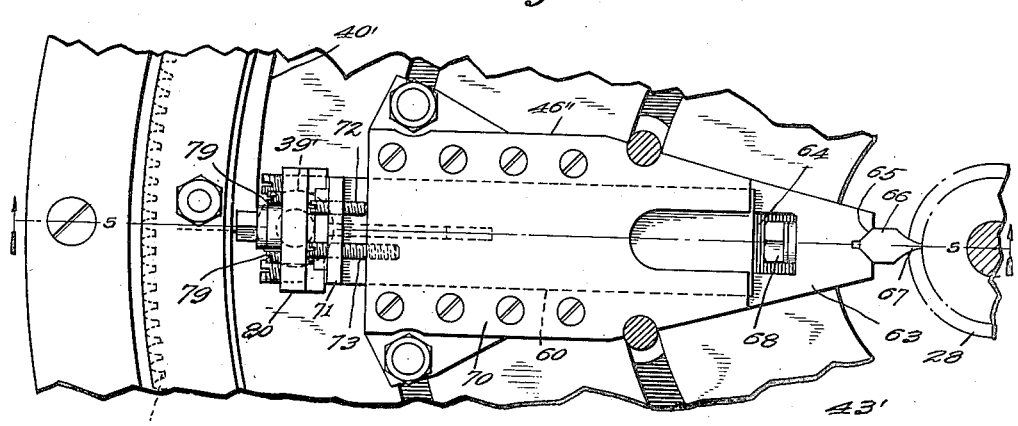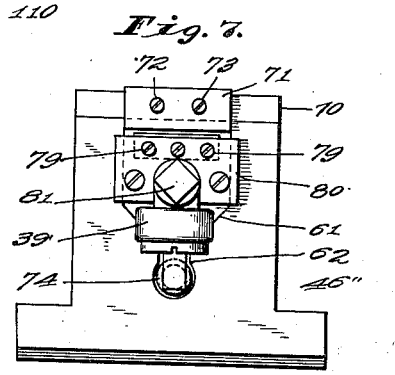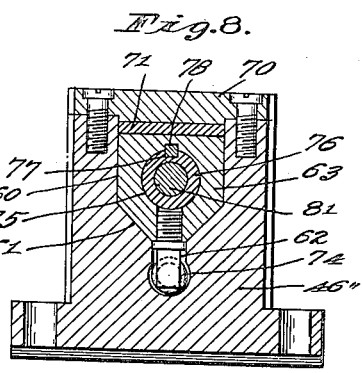

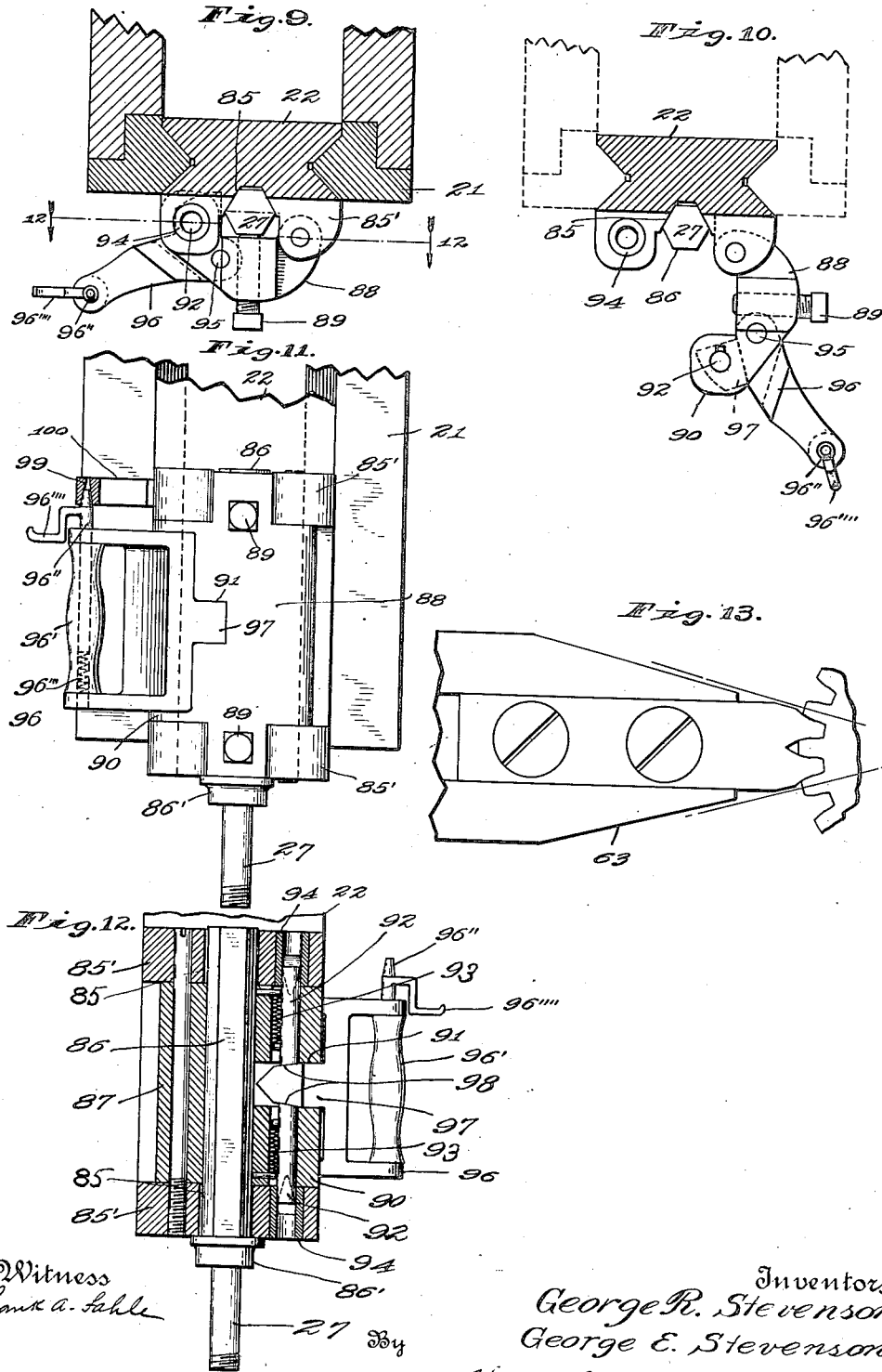

Feb. 13, 1923.

G. E. STEVENSON ET AL.
GEAR CUTTER.
FILED AUG. 8, 1919.

1,445,458.

6 SHEETS—SHEET 5.

Inventors
George R. Stevenson,
George E. Stevenson.
By Hood&Schley, Attorneys

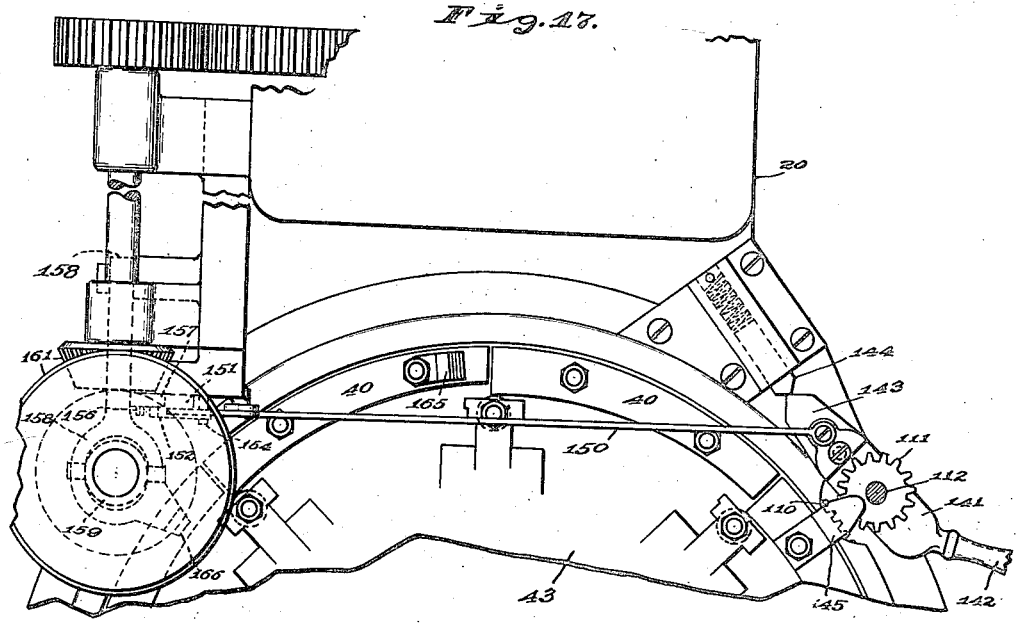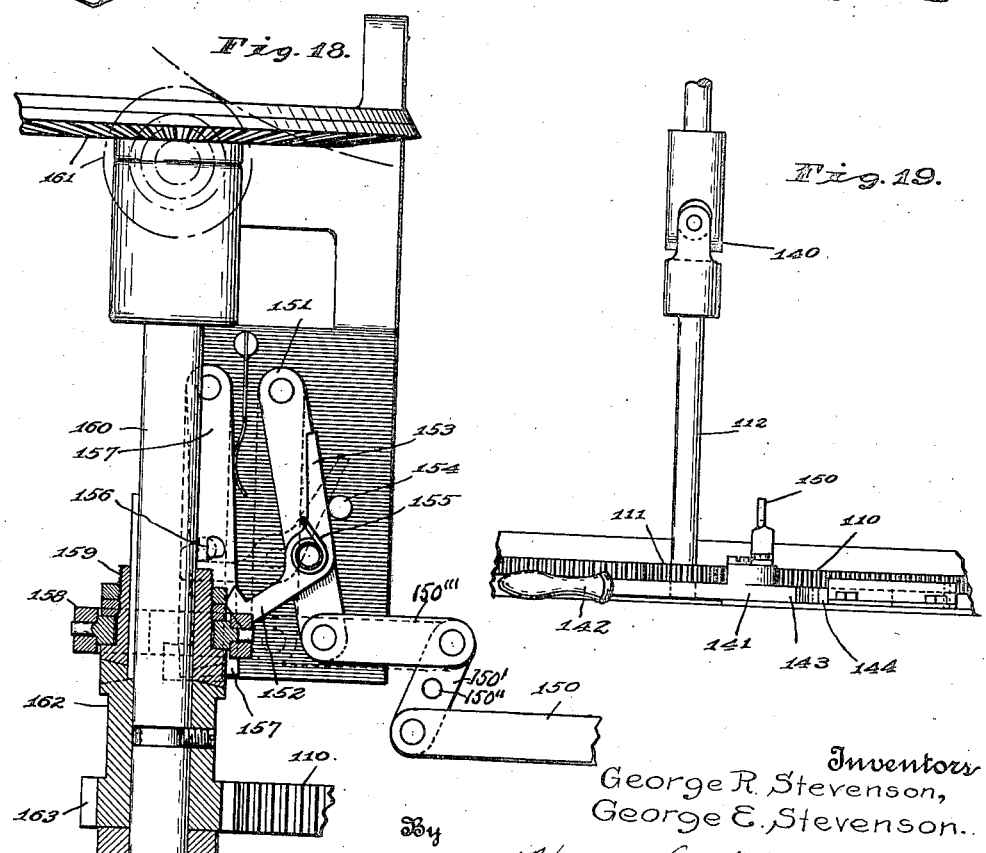

Patented Feb. 13, 1923.

1,445,458

UNITED STATES PATENT OFFICE.

GEORGE E. STEVENSON AND GEORGE R. STEVENSON, OF INDIANAPOLIS, INDIANA; ASSIGNORS TO STEVENSON GEAR & MANUFACTURING COMPANY, OF INDIANAPOLIS, INDIANA, A CORPORATION OF INDIANA.

GEAR CUTTER.

Application filed August 8, 1919. Serial No. 316,036.

*To all whom it may concern:*

Be it known that we, GEORGE E. STEVENSON and GEORGE R. STEVENSON, citizens of the United States, residing at Indianapolis, in the county of Marion and State of Indiana, have invented a new and useful Gear Cutter, of which the following is a specification.

The object of our invention is to produce a machine by means of which gear teeth may be formed upon a blank, or a series of blanks, rapidly and accurately, a plurality of teeth, preferably uniformly spaced around the entire circumference of the blank, or blanks, being formed simultaneously, thereby greatly increasing the speed of production.

Figure 3:
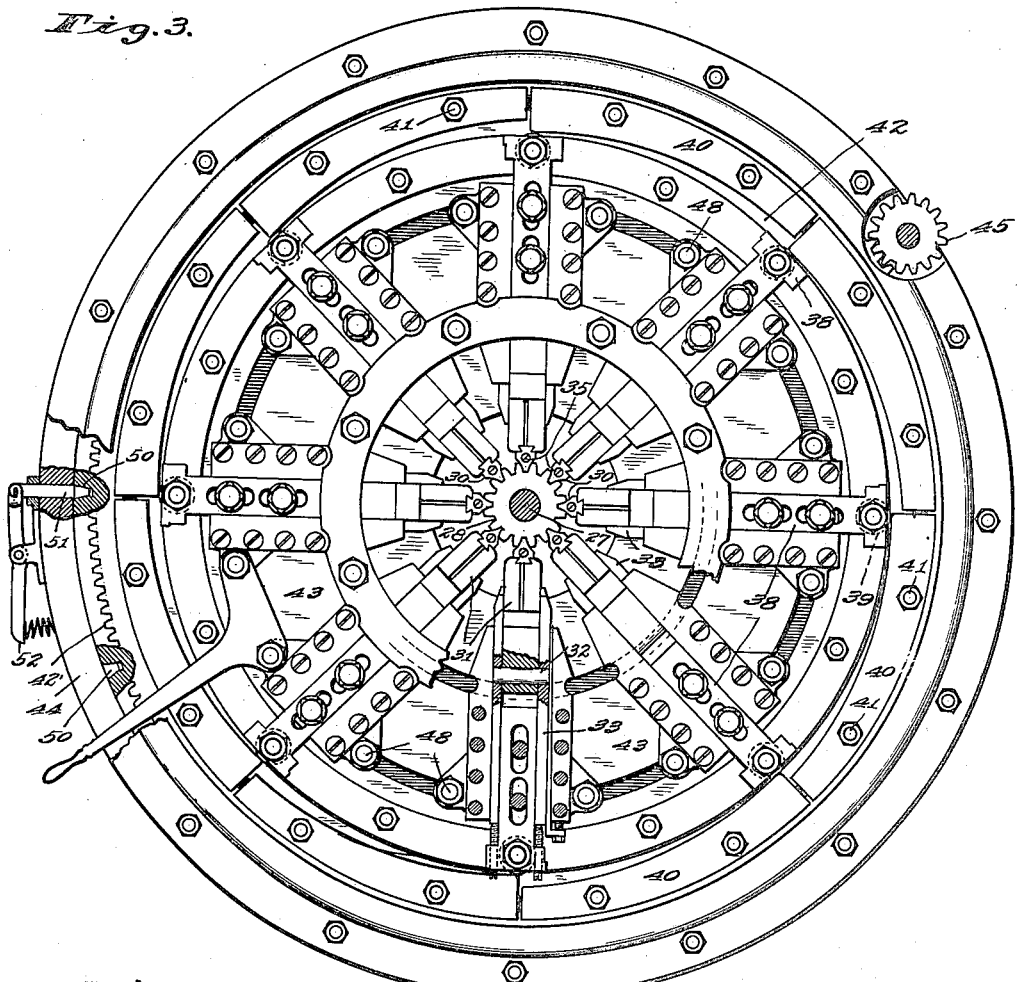
Figure 4:
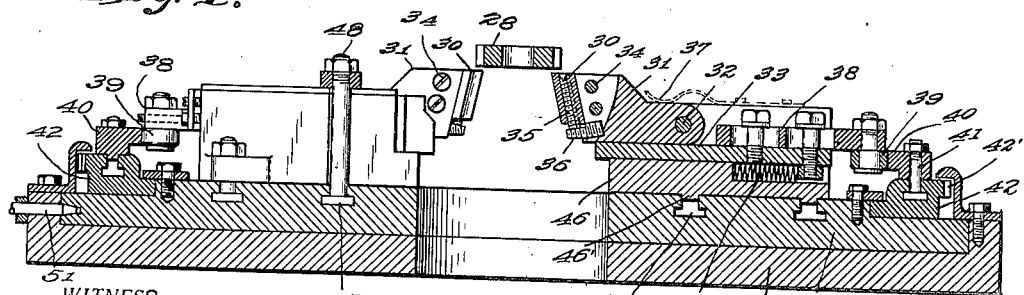
Figure 14:
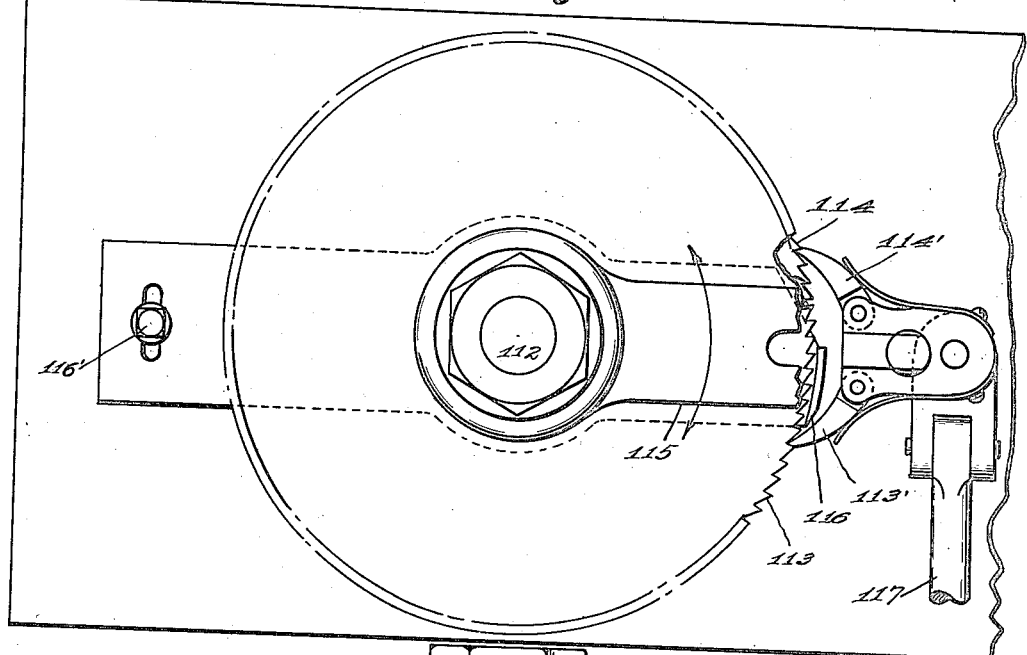
Figure 15:
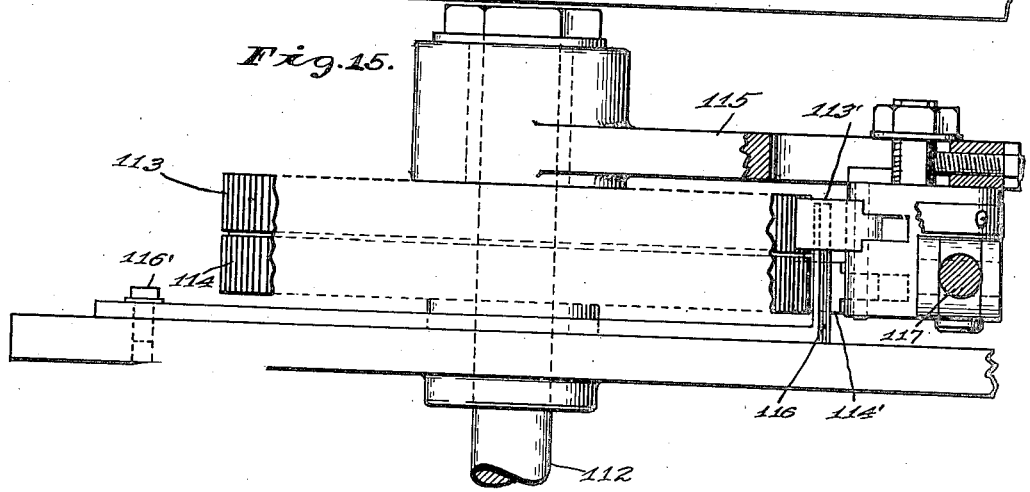
Figure 16:
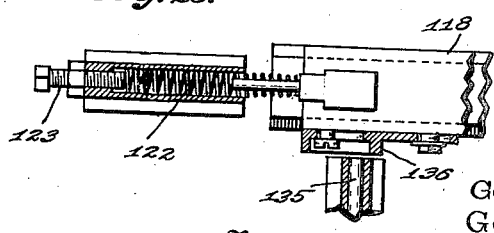

The accompanying drawings illustrate our invention, as embodied in a commercial apparatus. Fig. 1 is a side elevation of an apparatus embodying our invention, wherein the blank-carrying arbor is vertically reciprocated to accomplish the cutting operations; Fig. 2 is a front elevation; Fig. 3 a plan on an enlarged scale, of the tool-carrying head; Fig. 4 a transverse section of the parts shown in Fig. 3; Fig. 5 a vertical section (on line 5—5 of Fig. 6) on a larger scale, of one of the cutter heads and adjacent parts, the form being somewhat modified from that shown in Fig. 4; Fig. 6 a plan of the parts shown in Fig. 5; Fig. 7 an end elevation of the parts shown in Fig. 6; Fig. 8 a section on line 8—8 of Fig. 5; Fig. 9 a horizontal section of the arbor-carrying head, with the parts in arbor-clamping position; Fig. 10 a view similar to Fig. 9 with the clamp open; Fig. 11 a front elevation of the parts shown in Fig. 9; Fig. 12 a section on line 12—12 of Fig. 9; Fig. 13 a fragmentary plan of a slightly modified form of cutter; Fig. 14 a plan, in partial section, of the oscillating mechanism; Fig. 15 an elevation of the parts shown in Fig. 14; Fig. 16 a fragmentary detail, in partial section, of the lock-out construction; Fig. 17 a fragmentary plan of the automatic means for returning the cam ring to initial position; Fig. 18 a detail portion of said mechanism; and Fig. 19 a side elevation, on a smaller scale, of parts shown in Fig. 17.

In the present drawings, we have shown our invention as embodied in an apparatus in which the tool-carrying head is normally fixed during operation and the blank-carrying arbor is normally reciprocated.

In the drawings, 20 indicates a main frame provided with a vertical guide 21, within which is mounted a vertically reciprocable head 22 reciprocated by any well-known means, such, for instance, as the link 23, crank 24, and driving shaft 25. The head 22 is formed, in a manner which will be hereafter described, to receive a blank-carrying arbor 27 which will properly support one or more blanks 28 upon which teeth are to be cut.

I provide a plurality of tooth-forming cutters 30 which are sufficient in number to be arranged entirely around the axis of the gear blank and preferably evenly circumferentially spaced. In Fig. 3, I show a sufficient number of cutters to produce the valley between each alternate pair of teeth and this is probably the best arrangement for comparatively small gears. It will be understood, however, that in the formation of larger gears, where there is sufficient space, there will be provided as many cutters as there are valleys between the teeth.

In the construction shown in Figs. 3 and 4, each cutter 30 is of a uniform cross-section, giving proper shape for the valley between adjacent teeth and is provided upon its rear face with a dove-tailed portion, shown in Fig. 3, which fits between suitably formed jaws of a clapper 31 pivoted at 32 to the tool-bar 33 which forms an abutment for clapper 31. The jaws of clapper 31 are clamped upon the cutter by clamping screws 34 and, in order that the cutter may be nicely adjusted so as to have its active face in a common plane with the active faces of the other cutters, we provide a temper screw 35 which is threaded through the cutter and rests at its lower end upon an abutment 36 carried by the clapper, said abutment being conveniently formed by a stud threaded into a suitable opening in the clapper between the jaws and slightly flattened to form a stop for a screw 35. The clapper may be normally urged downwardly to operative position by a light spring 37, as indicated in dotted lines in Fig. 4. Tool bar 33 has adjustably clamped to it an extension 38 which carries a roller 39 at its outer end, said roller being adapted to engage any one of a series of cams 40. The several cams 40 are clamped in place by T-bolts 41, the heads of which lie in an annular undercut groove formed in a carrying ring 42, rotatably mounted upon the rotatable carrier 43 which is rotatably mounted in a base plate 44. Ring 42 is provided with a circumferential series of teeth 42' adapted to be engaged by a pinion 45 by which the ring 42 may be rotated. Each tool bar 33 is slidably mounted in a radius block 46 which is provided on its under surface with segmental ribs 46' fitting in annular T-grooves 47 formed in carrier 43 and clamping bolts 48 are provided to clamp the blocks 46 in place. By this arrangement, as many cutters may be provided as can conveniently operate simultaneously upon the gear blank and they may be adjusted so that each cutter will be presented in the radial line of the desired tooth-valley which is to be formed by the cutter. In each block 46 is a spring 49 which acts upon the tool bar 33 tending to retract the cutter radially from the axis of the gear blank and hold the roller 39 in engagement with the adjacent cam 40. The several cams 40 are duplicates and each has an active inner face designed to cause proper successive advancements of the cutters in order to produce the desired depth of tooth-valley, these cams being preferably of such length and so formed that when they have been advanced through their lengths, they may be carried beyond the adjacent rollers 39, so that said rollers will drop into engagement with the lowest points of the next cam, thus automatically retracting the cutters, so that they will be ready for operation upon the new blank, or set of blanks.

Where the number of cutters is less than the number of teeth to be cut, the carrier 43 is provided with means by which it may be shifted to bring the cutters into position to operate at new points upon the blank and this may be conveniently done by providing the carrier with two or more properly-spaced sockets 50 (Fig. 3) adapted to receive a locking pin 51 carried by lever 52 mounted on plate 44.

In Figs. 5–8, inclusive, we show a modified form of cutter and carrying parts. In this form, the carrier 43' supports a block 46" having a groove 60 in its upper face, said groove having inwardly and downwardly inclined shoulders 61 leading to a groove 62. In this groove is mounted the tool bar 63 which is provided in its upper surface with a pocket 64 and in its forward end with a notch 65 adapted to receive the correspondingly-shaped rear face of cutter 66 having a uniform-section active cutting edge 67. The cutter 66 is firmly clamped in place by the clamping screws 68, the heads of which lie in pocket 64 and this cutter rests upon an abutment 69 carried by bar 63. Bar 63 is formed on its lower face so as to seat upon and be centralized by an inclined shoulder 61 and in order to hold the bar in place, we provide a cover plate 70 and an intermediate wedge 71 adjustably held in place by the abutment screw 72 and the draw screw 73. Bar 63 must slide freely in its seat groove and is normally urged outwardly by a spring 74. Bar 63 is longitudinally bored at 75 and in this bore is a sleeve 76 which is provided with a key-way 77 adapted to receive the key 78 engaged by a pair of temper screws 79 carried by a collar 80 upon which the roller 39' (similar to roller 39) is journaled. The collar 80 is sleeved upon a bolt 81 which is threaded into body 63. By adjusting bolt 81 in body 63, and tightening the temper screws 79 against key 78, the distance between the cutting edge of the tooth-forming tool 66 and the axis of roller 39' may be accurately adjusted so that there may be proper cooperation with the cams 40' which are similar to cams 40. Cams 40' are carried by a ring 42" similar to ring 42.

It is, of course, important that the various cutting tools having once been properly set so as to coordinate with the several cams, which control their radial movement, the successive gear blanks to be operated upon by the machine be accurately centered relative to the cutting tools.

For this purpose, I provide the sliding head 22 with a tapered longitudinal seat 85 (Figs. 9–12) which is conveniently semi-hexagonal, so as to receive the correspondingly shaped shank 86 of the blank carrying spindle 27 upon which the blanks 28 are mounted. I prefer to provide two seats 85, 85 (Fig. 12) which are considerably separated longitudinally, these seats being conveniently formed in adjacent lugs 85'. Between the lugs on one side I pivot a swinging clamp 88 which carries a pair of temper screws 89, 89 adapted to be properly adjusted to be brought into contact with shank 86 to clamp it in seats 85. Clamp 88 is provided with a nose 90 which fits between two of the lugs 85' (one of each pair) and this nose is provided with a lateral notch 91. Nose 90 is longitudinally bored so as to receive, upon each side of notch 91, a locking pin 92 which is normally spring-urged to retracted position by a spring 93. Each pin 92 is provided with a tapered end and this tapered end is adapted to enter a bushing 94 in the adjacent lug 85' and is so formed as to coact with the tapered portion of the locking pin 92. Pivoted at 95 on clamp 88 is an operating lever 96 capable of a limited swing upon clamp 88 and this lever 96 is provided with a finger 97 adapted to swing in notch 91 and formed with wedge faces 98 adapted to engage the inner adjacent ends of pins 92 and project them into the adjacent bushings 94. Lever 96 is provided with a handle 96' in which is mounted a bolt 96'' normally urged outwardly by a light spring 96''' (dotted lines Fig. 11). Bolt 96'' is also provided with a finger piece 96'''' by which it may be retracted and its upper end is tapered so as to enter a tapered seat 99 formed in a lug 100 carried by head 22. The construction of this spindle clamp is such that the shank 94 having been placed in seat 85 with its collar 86' against the lower end of the head 22, clamp 88 may be swung into the position shown in Fig. 9 so as to bring temper screws 89 into engagement with shank 86 and centralize it in the seats 85. Continued pressure on the operating lever 96 forces the wedge cams 98 between locking pins 92 so as to force these pins in opposite directions into bushings 94 where the cooperating cam surfaces serve to further tighten the clamping head 88 into clamping position, the desired result being obtained very quickly and easily.

Where a cutter carrier of the type shown in Figs. 5 and 6 is used, it is, of course, desirable to provide means by which the cutters will be retracted slightly preceding the return strokes so that their cutting edges will not be dulled by dragging on the gear blank. In order to accomplish this operation, I provide the cam carrier 42'' with an external gear 110 engaged by a pinion 111 carried by a shaft 112. Secured to the upper end of shaft 112 are two ratchet wheels 113 and 114 having their teeth arranged in opposite directions, as indicated in Fig. 14. Pivoted upon the upper end of shaft 112 is an arm 115 carrying two oppositely arranged pawls 113' and 114' acting respectively on the ratchet wheels 113 and 114 so as to reciprocate shaft 112 alternately in opposite directions. In order that the forward movement of shaft 112 may be greater than the retraction of said shaft, I provide an adjustable guard 116 (Figs. 14 and 15) pivoted on shaft 112 and held in any desired position of angular adjustment by the clamping screw 116'. This guard 116 is placed so as to overlie a portion of the periphery of ratchet 113 in such manner that during the movement of arm 115 to produce forward movement of shaft 112, pawl 113' will be caused to ride over the guard 116 so that on the return movement of arm 115, the initial portion of that movement will be inactive so far as any action upon the shaft 112 is concerned, therefore causing a retracting movement of shaft 112 which is less than its forwarding movement. Arm 115 is reciprocated by means of a link 117 connected to a reciprocating slide 118 (Fig. 1) which is provided at one end with a roller 119 adapted to be engaged by cam 120 carried by the main drive shaft 25.

Slide 118 is normally urged toward cam 120 by spring 122 having an adjustable abutment 123.

In order that the feeding action may be automatically discontinued when the production of a gear blank has been completed, I provide the following mechanism for automatically locking slide 118 in retracted position. Journaled on the main frame is a ratchet wheel 130 operated by a bell crank pawl 131, the arrangement being such that this ratchet will be given one complete turn during the forward movement of the cutter carrying head through an angle equal to one of the cams 40', the lever 131 being intermittently actuated by a shoulder 132 on slide 118. Ratchet 130 carries a cam 133 adapted to be engaged by a lever 134 which is connected to a lock pin 135 normally held in retracted position by the main portion of cam 133, but capable when permitted by said cam, of being projected in front of an adjustable shoulder 136 (Fig. 16) carried by slide 118. Overthrow of ratchet 130 may be prevented by a friction block 137, of common form, and reverse direction may be prevented by a retaining pawl 138.

In order to insure against further forwarding movement of the cam-carrying ring, I provide shaft 112 at an intermediate point with a universal joint 140 and I journal the lower end of shaft 112 in a pivoted carrier 141 provided with a hand lever 142, the arrangement being such that the lower end of shaft 112 may be laterally displaced so as to separate pinion 111 from mesh with gear 110. In order to hold pinion 112 in either meshing or retracted position, one end of carrier 141 is formed into a retaining cam 143 (Fig. 17) cooperating with a retaining plunger 144.

In order that the cams 40' may be automatically returned to initial position, upon completion of a gear, I provide the following mechanism: Attached to arm 141 is one end of a link 150, the other end of which is connected by a lever 150', pivoted at 150'', and a link 150''' to a swinging arm 151 carrying a catch 152 having a tail 153 held against pin 154 by spring 155. Catch 152 is formed to hook under a pin 156 carried by a swinging catch 157 formed to swing under the clutch shifting yoke 158 which controls a clutch member 159 keyed upon shaft 160 constantly driven by suitable gears 161.

Clutch member 159 cooperates with a clutch member 162 connected to, or forming part of, a pinion 163 meshing with gear 110. When gear 111 is in mesh with gear 110, catch 157 will be in position to hold yoke 158 so as to keep member 159 out of mesh with member 162, and catch 152 will be in engagement with pin 156 of catch 157 (see dotted lines Fig. 18). When arm 141 is shifted to separate pinion 111 from gear 110, catch 152 will first draw catch 157 from under yoke 158 to permit clutch 159 to engage clutch 162 and thus reverse the movement of gear 110. When yoke 158 descends, it blocks the return of catch 157 and as arm 151 swings to the right (Fig. 18) pin 154 serves to retract catch 152 from pin 156 so as to permit catch 157 to swing back against yoke 158 by which further return movement is prevented. In due course in the return movement of gear 110, a cam 165 is brought under a projection 166 on yoke 158 and lifts said yoke so as to withdraw clutch 159 and permit catch 157 to swing under the yoke. In due course, arm 141 may thereafter be swung to mesh pinion 110 with gear 111.

We claim as our invention:

1. In a tooth-forming machine, a carrier for blanks, a plurality of tooth-forming cutters arranged to act simultaneously upon the blank at circumferentially spaced positions, a plurality of carriers for said cutters, a cam structure arranged to act upon said carriers to control movement of the cutters toward the axis of the blank, means for automatically shifting said cam-structure to advance the cutters toward the axis of the blank after each cut, and means for causing movement relatively between the blank and cutters axially of the blank.

2. In a tooth-forming machine, a carrier for blanks, a plurality of tooth-forming cutters arranged to act simultaneously upon the blank at circumferentially spaced positions, a plurality of carriers for said cutters, a rotary cam structure arranged to act upon said carriers to control movement of the cutters toward the axis of the blank, means for automatically shifting said cam-structure to advance the cutters toward the axis of the blank after each cut, and means for causing movement relatively between the blank and cutters axially of the blank.

3. In a tooth-forming machine, a carrier for blanks, a plurality of tooth-forming cutters arranged to act simultaneously upon the blank at circumferentially spaced positions, a plurality of carriers for said cutters, a cam-structure arranged to act upon said carriers to control movement of the cutters toward and from the axis of the blank, means for shifting said cam-structure to produce movement of the cutters alternately toward and from the axis of the blank with a gradual approach to said axis, and means for causing movement relatively between the blank and cutters axially of the blank.

4. In a tooth-forming machine, a carrier for blanks, a plurality of tooth-forming cutters arranged to act simultaneously upon the blank at circumferentially spaced positions, a plurality of carriers for said cutters, a rotary cam structure arranged to act upon said carriers to control movement of the cutters toward and from the axis of the blank, means for shifting said cam-structure to produce movement of the cutters alternately toward and from the axis of the blank with a gradual approach to said axis, and means for causing movement relatively between the blank and cutters axially of the blank.

5. In a tooth-forming machine, a carrier for blanks, a plurality of tooth-forming cutters arranged to act simultaneously upon the blank at circumferentially spaced positions, a plurality of carriers for said cutters, a cam-structure arranged to act upon said carriers to control movement of the cutters toward and from the axis of the blank, a shaft connected with said cam-structure, ratchet means for driving said shaft alternately in opposite directions differentially, means for causing movement relatively between the blank and cutters axially of the blank, and means co-ordinated with said last-mentioned means for operating said shaft-driving means.

6. In a tooth-forming machine, a carrier for blanks, a plurality of tooth-forming cutters arranged to act simultaneously upon the blank at circumferentially spaced positions, a plurality of carriers for said cutters, a cam-structure arranged to act upon said carriers to control movement of the cutters toward and from the axis of the blank, a shaft connected with said cam-structure, means for driving said shaft alternately in opposite directions differentially, means for causing movement relatively between the blank and cutters axially of the blank, and means co-ordinated with said last-mentioned means for operating said shaft-driving means.

7. In a tooth-forming machine, a carrier for gear blanks, a plurality of tooth-forming cutters arranged to act simultaneously upon the blank at circumferentially spaced positions, a plurality of carriers for said cutters, a cam-structure arranged to act upon said carriers to control movement of the cutters toward and from the axis of the blank, a shaft connected with said cam-structure, ratchet means for driving said shaft alternately in opposite directions differentially, means for causing movement relatively between the blank and cutters axially of the blank, means coordinated with said last-mentioned means for operating said shaft-driving means, and means for automatically disconnecting the cam-driving train.

8. In a tooth-forming machine, a carrier for blanks, a plurality of tooth-forming cutters arranged to act simultaneously upon the blank at circumferentially spaced positions, a plurality of carriers for said cutters, a cam-structure arranged to act upon said carriers to control movement of the cutters toward and from the axis of the blank, a shaft connected with said cam-structure, means for driving said shaft alternately in opposite directions differentially, means for causing movement relatively between the blank and cutters axially of the blank, means coordinated with said last-mentioned means for operating said shaft-driving means, and means for automatically disconnecting the cam-driving train.

9. In a tooth-forming machine, a plurality of tooth-forming cutters arranged to act simultaneously in spaced circumferential relations about a common axis, a plurality of carriers for said cutters, a rotary cam-structure arranged to act simultaneously on said carriers to control movement of their cutters toward the common axis, a gear for driving said cam-structure, and means carried by the cam-structure for disconnecting said gear.

10. In a tooth-forming machine, a plurality of tooth-forming cutters, arranged to act simultaneously in spaced circumferential relations about a common axis, a plurality of carriers for said cutters, a rotary cam-structure arranged to act simultaneously on said carriers to control movement of their cutters toward the common axis, a gear for driving said cam-structure and means for disconnecting said gear.

11. In a tooth-forming machine, a plurality of tooth-forming cutters arranged to act simultaneously in spaced circumferential relations about a common axis, a plurality of carriers for said cutters, a rotary cam-structure arranged to act simultaneously on said carriers to control movement of their cutters toward the common axis, a gear for driving said cam-structure, a shaft carrying said gear, and means carried by the cam-structure for shifting said shaft laterally to disconnect said gear from the cam-structure.

12. In a tooth forming machine, a plurality of tooth-forming cutters arranged to act simultaneously in spaced circumferential relations about a common axis, a plurality of carriers for said cutters, a rotary cam-structure arranged to act simultaneously on said carriers to control movement of their cutters toward the common axis, a gear for driving said cam-structure, a shaft carrying said gear, and means for shifting said shaft axially to disconnect said gear from the cam-structure.

13. In a tooth-forming machine, a carrier for gear blanks, a plurality of tooth-forming cutters arranged to act simultaneously upon the blank at circumferentially spaced positions, a plurality of carriers for said cutters, a cam structure arranged to act upon said carriers to control movement of the cutters toward the axis of the blank, means for shifting said cam-structure, means coordinated with the cam-structure for automatically putting the cam-structure-driving-means in inactive condition, and means for causing movement relatively between the blank and cutters axially of the blank.

14. In a tooth-forming machine, a carrier for gear blanks, a plurality of tooth-forming cutters arranged to act simultaneously upon the blank at circumferentially spaced positions, a plurality of carriers for said cutters, a rotary cam structure arranged to act upon said carriers to control movement of the cutters toward the axis of the blank, means for shifting said cam-structure, means coordinated with the cam-structure for automatically putting the cam-structure-driving-means in inactive condition.

15. In a tooth-forming machine, a carrier for gear blanks, a plurality of tooth-forming cutters arranged to act simultaneously upon the blank at circumferentially spaced positions, a plurality of carriers for said cutters, a cam-structure arranged to act upon said carriers to control movement of the cutters toward and from the axis of the blank, means for shifting said cam-structure to produce movement of the cutters alternately toward and from the axis of the blank with a gradual approach to said axis, means coordinated with the cam-structure for automatically putting the cam-structure-driving-means in inactive condition, and means for causing movement relatively between the blank and cutters axially of the blank.

16. In a tooth-gearing machine, a carrier for gear blanks, a plurality of tooth-forming cutters arranged to act simultaneously upon the blank at circumferentially spaced positions, a plurality of carriers for said cutters, a rotary cam structure arranged to act upon said carriers to control movement of the cutters toward and from the axis of the blank, means for shifting said cam-structure to produce movement of the cutters alternately toward and from the axis of the blank with a gradual approach to said axis, means co-ordinated with the cam-structure for automatically putting the cam-structure-driving means in inactive condition, and means for causing movement relatively between the blank and cutters axially of the blank.

17. The combination with a rotary member, of two driving members therefor for alternate active connection therewith, means for rendering one of said driving members inactive, means controlled by said last-mentioned means for automatically rendering the second driving means active, and means controlled by the rotating member for rendering the second driving means inactive without affecting the first driving means.

18. The combination with a rotary member, of two driving members therefor for alternate active connection therewith, means for rendering one of said driving members inactive, means controlled by said last-mentioned means for automatically rendering the second driving means active, and means controlled by the rotating member for rendering the second driving means inactive.

19. The combination with a rotary member, of a driving train therefor, means for establishing and dis-establishing said train, a second driving train for the rotary member, means connected to the dis-establishing mechanism of the first train for establishing the second train, and means controlled by the rotary member for dis-establishing the second train.

20. The combination with a rotary member, of a driving train therefor, comprising separable clutch members, a catch for retaining one of said members in inactive position, and a withdrawing member for said catch having a connection therewith separable therefrom in withdrawing operation, for the purpose set forth.

21. The combination with a rotary member, of a driving train therefor, comprising separable clutch members, a catch for releasing one of said members in inactive position, a withdrawing catch having a separable connection with said first-mentioned catch, and means, acting upon the second catch in withdrawing direction, to withdraw it from the first catch after said first catch has released its clutch member.

22. In a tooth-forming machine, a carrier for blanks, a plurality of tooth-forming cutters arranged to act simultaneously upon the blank at circumferentially spaced positions, a plurality of carriers for said cutters, a cam structure arranged to act upon said carriers to control movement of the cutters toward the axis of the blank, means for shifting the cam structure to cause said cutters to approach the axis of the blank, and means for causing movement relatively between the blank and cutters axially of the blank.

In witness whereof, we have hereunto set our hands at Indianapolis, Indiana, this sixth day of August, A. D. one thousand nine hundred and nineteen.

GEORGE E. STEVENSON.
GEORGE R. STEVENSON.